April 20, 1965

U. C. McMILLER 3,179,316

CAR TOP CARRIER

Filed May 17, 1963

INVENTOR
URBAN C. McMILLER
BY
Williamson & Palmatier
ATTORNEYS

United States Patent Office 3,179,316
Patented Apr. 20, 1965

3,179,316
CAR TOP CARRIER
Urban C. McMiller, Minneapolis, Minn., assignor to Karpak Company, Minneapolis, Minn., a corporation of Minnesota
Filed May 17, 1963, Ser. No. 281,231
5 Claims. (Cl. 224—42.1)

This invention relates to a luggage carrier of the type adapted to be mounted on the top of an automobile and more particularly to the base frame and clamping mechanism for such car top luggage carriers.

An object of this invention is to provide a novel collapsible type luggage carrier, of simple and inexpensive construction, which is readily but firmly attachable to the top of an automobile through provision of attachment means including clamping straps and coupling members releasably clamping the base frame of the carrier against the car top.

A more specific object of this invention is the provision in a car top carrier of a novel and improved base frame including transverse frame members formed of somewhat flexible, resilient material to generally conform to the transverse contour of the car top, and attachment means comprising adjustable clamping straps and coupling members for fastening the base frame to the car top through releasable engagement with the conventional rain gutters of the car.

A further object of this invention is the provision of a car top luggage carrier of the class described wherein the coupling members have hooked ends for releasable engagement with the base frame and are longitudinally adjustable relative to the clamping straps to thereby readily accommodate automobile tops of varying shapes and sizes.

These and other objects and advantages of my invention will more fully appear from the following description made in connection with the accompanying drawings, wherein like character references refer to the same or similar parts throughout the several views, and in which.

Figure 1:
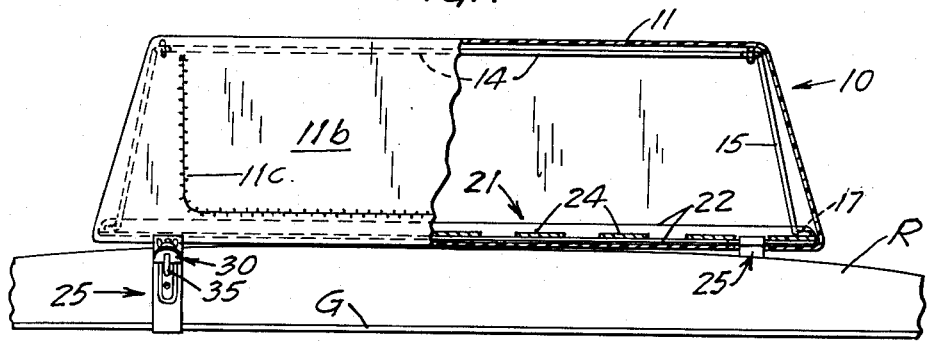
FIG. 1 is a side elevational view showing my invention applied to the top of an automobile and with certain parts thereof broken away for clarity.

Referring now to the form of the invention illustrated in the drawings, the upper body portion of a conventional automobile is illustrated having the usual roof R curved conventionally in cross sectional shape and having at its longitudinal sides, the usual elongated rain gutters G. In the embodiment of the luggage carrier illustrated, which is designated generally by the reference numeral 10, the carrier is of a collapsible covered type which comprises a truncated pyramidal, flexible cover 11 preferably constructed of a suitable impervious plastic and which is supported by a collapsing support frame 12.

The support frame 12 is comprised of a pair of metal frame members or bows 13 which are of inverted U-shape and which as shown extend longitudinally of the roof as best seen in FIG. 1. It will be noted that each of the frame members 13 includes a bight portion 14 and leg portions 15 which diverge downwardly therefrom. Each of the frame members 13 is bent to define loops 16 located at each end of the bight portions 14 and the lower end of each of the logs 15 is offset to define a foot element 17.

The respective frame members 13 are interconnected when in the erect position by transverse link braces 18 extending between and interconnecting the respective front and rear portions of the frame members. It will be noted that one end of each of the transverse links 18 is bent to define an eyelet 19 which is secured to one of the loops 16 while the other of the respective ends of each link is offset to define a loop-engaging hook 20 which releasably engages a loop of the other frame member. Thus it will be seen that when it is desirable to collapse the frame 12, it is merely necessary to remove the hook from the respective loop of one of the frame members 13 whereby the entire frame member may be collapsed. It is also pointed out that when the frame member is in the erect position, the flexible cover 11 will be distended or expanded into the operative erect position for receiving the luggage therewithin.

Figure 4:
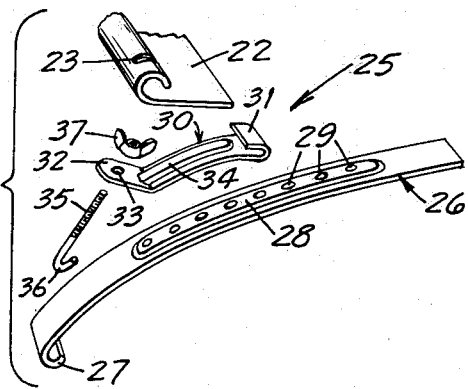
FIG. 4 is an exploded perspective of the clamping mechanism.

The carrier 10 also includes a generally rectangular substantially rigid base frame 21 which in the form shown includes a pair of longitudinal side members 22. These elongate side members are of channel-shaped cross sectional configuration and the overhanging flange portion of each side member is suitably slotted adjacent its respective end as at 23 as best seen in FIG. 4, to receive the respective foot element of each frame member 13 therethrough.

The side members 22 which are preferably constructed of a rigid metallic material are interconnected along their respective lengths by a plurality of elongated transversely extending frame or slat members 24. These slat members 24 are of generally rectangular substantially flat construction and are formed of a resilient somewhat flexible nonmetallic plastic material to permit limited flexing thereof so that these slat members will conform generally to the transverse contour of the automobile roof. These slat or frame members 24 are interconnected to the side members 22 by any suitable securing means such as rivets or the like.

It will be seen that both the support frame and base frames are positioned entirely within the cover 11 and access to the interior of the carrier cover is provided through an opening in one side of the cover, this opening being closed by a closure flap 11b through the medium of a conventional zipper or closure fastener 11c. Thus when the support frame 12 is collapsed, the entire carrier may be collapsed to a structure of relatively small compass.

Means are also provided for very securely but releasably attaching the carrier to the roof or top of the automobile. This fastening means includes a plurality of clamping mechanisms each designated generally by the reference numeral 25 and located adjacent the respective corners of the carrier. It will be seen that each of the clamping mechanisms 25 includes elongate generally longitudinally bowed clamping strap 26 preferably formed of suitable metallic material such as sheet steel or the like and covered with a rather hard coating of plastic to present a smooth exterior. The outer end of each of the clamping straps 26 is arcuately bent as at 27 to define a hook for engagement with the outturned flange defining the rain gutter G adjacent the sides of the automobile top. The central portion of each of the clamping straps 26 is upwardly offset to define a longitudinally extending positioning surface or element 28. It will be noted that this positioning element is provided with a plurality of apertures 29 therethrough the function of which will be set forth more clearly hereinbelow.

Each of the clamping mechanisms 25 is also comprised of a frame engaging coupling member 30 which is also preferably formed of suitable metallic material such as sheet steel and which has its inner end arcuately bent to define a hook 31 which engages the inner edge of the associated side member 22. The outer end of each of the coupling members 30 is bent or struck upwardly to define an attachment ear or tab 32 provided with an aperture 33 therethrough as best seen in FIG. 4. It will be noted that each of the coupling members 30 has a central portion thereof bent upwardly to define a positioning element 34 shaped and contoured to fit in close cooperative relation with the positioning element 28 of the associated attachment strap. With this construction, each coupling member 30 may be positioned in predetermined accurate relation on its associated clamping strap 26.

Means are provided for tensioning the clamping strap and coupling member of each clamping mechanism with respect to the carrier and this tensioning means includes an elongate threaded element 35 having one end arcuately bent at 36 for insertion into a selected one of the apertures 29 in one of the clamping straps 26. The threaded end of the threaded element 35 projects through the aperture 33 in the associated coupling member 30 and a wing nut 37 threadedly engages each threaded element to retain each coupling member on its associated strap member.

When the luggage carrier 10 is to be mounted on the top of an automobile, the support frame 12 and the base frame will be positioned within the cover 11 and the support frame will be in the collapsed position. The closure flap 11b will be opened after the carrier is positioned upon the top of a car and the frame members 13 will be swung outwardly to the erect position. It is pointed out that when the frame members 13 are in the collapsed position, these members will lie one upon the other between the side members 22 of the base frame 21. The hook 20 on each transverse link 18 will be inserted into one of the loops 16 on one of the frame members 13 so that the support frame 12 will be maintained in its erect position.

Figure 2:
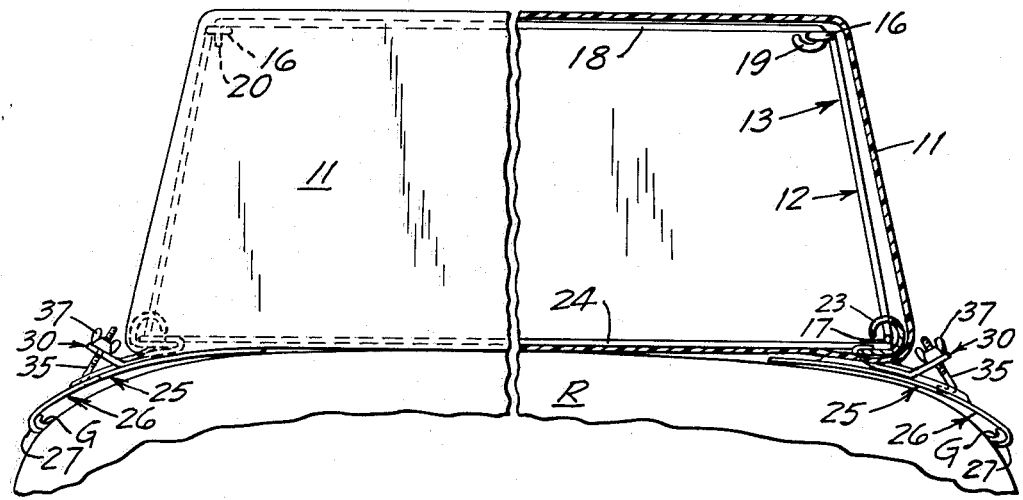
FIG. 2 is a front elevational view of the same foreshortened and with certain parts thereof broken away to more clearly illustrate the underlying concealed part.
Figure 3:
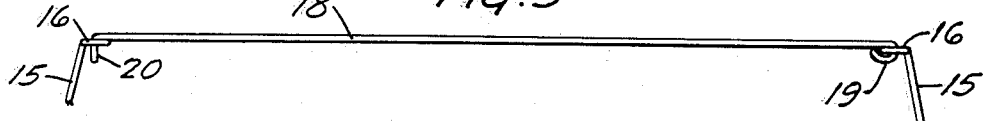
FIG. 3 is a detailed fragmentary elevational view illustrating the construction of the collapsible support frame.

When the support frame 12 is in the erected position, the cover will be expanded or distended to the shape illustrated in FIGS. 1 and 2 and the erected carrier may then be approximately oriented in the desired position on the roof R of the automobile. The coupling members 30 will then have their inner hooked ends 31 positioned in embracing hooked engagement with the respective inner edges of the side members 22. When the coupling members are disposed in engaging relation with the edges of the side members 22, these coupling members will project outwardly through suitable slots in the cover 11 as best seen in FIGS. 1 and 2. Since four clamping mechanisms 25 are provided, the cover 11 will also be provided with four such slots adjacent the respective lower corners thereof to accommodate the four coupling members.

Figure 5:
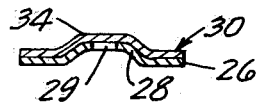
FIG. 5 is a cross sectional view of the clamping mechanism on an enlarged scale illustrating the cooperative relation of the coupling member and clamping strap.

The clamping straps of each of the clamping mechanisms 25 will then be positioned upon the automobile roof R so that the bent hooked ends 27 of each strap engages the gutter G adjacent the associated side thereof. One of the coupling members 30 will then be positioned upon each clamping strap 26 so that the respective positioning elements 28 and 34 thereof are in cooperative engaging relation as best seen in FIG. 5. The hooked end 36 of the threaded element 35 is then inserted into a selected one of the apertures 29 while the other end of the threaded element projects through the aperture 33 in the coupling member 30. The wing nut 37 is then tightened upon the threaded element whereby to move the coupling member 30 longitudinally of the clamping strap 36 in an outward direction and to shorten the effective clamping length of each clamping mechanism 25 and to apply tension thereto. Thus with this arrangement, the carrier 10 will be releasably but effectively clamped to the roof of the car.

When it is desirable to remove the carrier from clamped relation upon the automobile roof, it is merely necessary to loosen the wing nuts of the clamping mechanisms whereby to permit disengagement of the hooked end 27 of the strap members 26 from the rain gutters G. The support frame 12 may then be collapsed whereby the entire carrier structure may be stored in a compact bundle.

The cooperative adjustable relationship of each of the clamping mechanisms 25 permit attachment of the carrier to most conventional automobile car tops and the flexibility of the slats 24 also assures an effective seating of the luggage carrier on the car top regardless of the transverse contour thereof.

From the foregoing it will be seen that I have provided a novel luggage carrier which is provided with uniquely constructed clamping means and which accommodates substantially any conventional car top regardless of the particular shape and size thereof.

It will also be noted from the preceding paragraphs that my carrier apparatus includes a novel base frame structure comprised of side members and transverse frame members, the latter being formed of a resilient, somewhat flexible material whereby the bottom of the carrier apparatus will conform generally to the transverse contour of the automobile roof.

Thus it will be seen that I have provided a novel and improved luggage carrier apparatus which is not only of simple and inexpensive construction but one which functions more efficiently than heretofore known comparable devices.

It will of course be understood that various changes may be made in the form, details, arrangement and proportions of the various parts without departing from the scope of my invention.

What is claimed is:

1. In a car top luggage carrier having a generally rectangular base frame including longitudinal side members,
   a plurality of longitudinally spaced-apart transverse members extending between and connected with said side members, said transverse members being formed of resilient, somewhat flexible material to conform to the transverse contour of the automobile roof,
   means for adjustably and releasably clamping the base frame against the roof of a car comprising a plurality of elongate, generally flat substantially rigid clamping straps of fixed length and each being oriented transversely of the car roof adjacent one side thereof and each having its outer end arcuately bent to define a hook engageable with the outturned flange provided by the top of a car such as the rain gutter,
   a plurality of frame-engaging coupling members each being mounted longitudinally upon the upper surface of and intermediate the ends of one of said straps and each having its inner end bent to define a hook releasably engageable with the edge of the side members of the base frame,
   and an adjustable tensioning member interconnecting each of said frame-engaging coupling members and its associated coupling strap and being variously adjustable to cause sliding movement of the coupling member longitudinally along the upper surface of its associated coupling strap whereby to clamp the base frame against the car roof.

2. In a car top luggage carrier having a base frame, and including longitudinal side members of generally channel-shaped cross sectional configuration,
   a plurality of elongate longitudinally spaced-apart substantially flat transverse members extending between and connected with said side members, said transverse members being formed of resilient, somewhat flexible material to conform to the transverse contour of the automobile roof,
   means for adjustably and releasably clamping the base frame against the roof of a car comprising a plurality of elongate, slightly longitudinally bowed, substantially flat substantially rigid clamping straps of fixed length and each being oriented transversely of the car roof adjacent one side thereof and each having its outer end arcuately bent to define a hook engageable with the outturned flange provided by the top of a car such as a rain gutter, each of said clamping straps having an elongate longitudinally extending positioning element thereon, a plurality of frame-engaging coupling members each being mounted longitudinally upon the upper surface and intermediate the ends of one of said straps and each having its inner end bent to define a hook releasably engageable with the edge of one of the side members of the base frame, said hook end of each frame coupling member being oppositely bent with respect to the hook of the associated clamping strap, each of said coupling members having an elongate longitudinally extending positioning element thereon cooperatively engaging the positioning element on its associated clamping strap, and an adjustable and releasably tensioning means interconnecting each of said frame-engaging coupling members and its associated coupling strap and being variously adjustable to cause sliding movement of the coupling member longitudinally outwardly upon the upper surface of its associated coupling strap whereby to clamp the base frame against the car roof.

3. In a car top luggage carrier having a base frame of generally rectangular configuration including a pair of generally parallel longitudinal, channel-shaped side members, a plurality of substantially flat elongate longitudinally spaced-apart transverse members extending between and connected with said side members, said transverse members being formed of resilient, flexible material to confrom to the transverse contour of the automobile roof, a plurality of clamping mechanisms for adjustably and releasably clamping the base frame against the roof of a car comprising an elongate substantially flat, rigid, slightly longitudinally bowed, clamping strap of fixed length and oriented transversely of the car roof adjacent one side thereof and having its outer end bent to define a hook engageable with the outturned flange provided by the top of the car such as the rain gutter, each clamping strap having a plurality of longitudinally spaced-apart apertures therein and each having an elongate longitudinally extending channel-shaped positioning element thereon, each clamping mechanism including a frame-engaging coupling member mounted longitudinally upon the upper surface and intermediate the ends of each strap and each having its inner end bent to define a hook releasably engageable with the edge of one of the side members of the base frame and being oppositely bent with respect to the hook of the associated clamping strap, each coupling member having an elongate longitudinally extending channel-shaped positioning element thereon engageable with the positioning element on the associated coupling strap, each coupling member having an upturned outer end portion, tensioning means interconnecting each of said frame-engaging coupling members and its associated coupling strap, said tensioning means for each clamping mechanism including a tensioning element engageable with the upturned outer end portion of the associated coupling member and extending through a selected aperture of the associated coupling strap and being engageable with the latter, and means for adjusting said tensioning element to cause movement of the associated member longitudinally of its associated coupling strap whereby to clamp the base frame against the car roof.

4. In a car top luggage carrier having a flexible covering having a generally quadra-lateral support frame for supporting the cover.

a generally rectangular base frame connected and supporting said collapsible support frame and having a pair of generally parallel longitudinal side members, a plurality of longitudinally spaced-apart transverse members extending between and connected with said side members, said transverse members being formed of resilient, somewhat flexible material to conform to the transverse contour of the automobile roof, means for adjustably and releasably clamping the base frame against the roof of a car comprising a plurality of elongate substantially flat rigid clamping straps of fixed length and each being oriented transversely of the car roof adjacent one side thereof and each having its outer end arcuately bent to defiine a hook engageable with the outturned flange provided by the top of a car such as the rain gutter, a plurality of frame-engaging coupling members each being slidably mounted longitudinally upon the upper surface and intermediate the ends of one of said straps and each having its inner end bent to define a hook releasably engageable with the edge of one of the side members of the base frame, each coupling member having an upturned outer end portion, cooperating longitudinally extending channel-shaped positioning elements on each coupling member and clamping strap, and adjustable and releasable tensioning means interconnecting the upturned outer end portion each of said base frame-engaging coupling members and its associated coupling strap and being variously adjustable to cause sliding movement of the coupling member longitudinally of the associated coupling strap upon the upper surface thereof whereby to clamp the base frame against the car roof.

5. The structure as defined in claim 4 wherein each of said members of the base frame has a pair of upwardly facing slots therein, each slot located adjacent one end of the side member, and wherein said support includes a pair of inverted longitudinally extending U-shaped frame members, each having its respective ends projecting into the slots of one of said side members for support thereby.

References Cited by the Examiner
UNITED STATES PATENTS

| | | | |
|---|---|---|---|
| 2,621,836 | 12/52 | McMiller | 224—42.1 |
| 2,645,391 | 7/53 | Lecanu-Deschamps | 224—42.1 |

FOREIGN PATENTS 542,961   5/56   Italy.

HUGO O. SCHULZ, *Primary Examiner.*